Sept. 1, 1964  
W. P. BROWN  
METHOD AND APPARATUS FOR WASHING AND WAXING VEHICLES AND THE LIKE  
Filed Sept. 5, 1961

INVENTOR.
WILLIAM P. BROWN
BY
Toulmin & Toulmin
ATTORNEYS

INVENTOR.
WILLIAM P. BROWN
BY
Toulmin & Toulmin
ATTORNEYS

Sept. 1, 1964 W. P. BROWN 3,147,135
METHOD AND APPARATUS FOR WASHING AND
WAXING VEHICLES AND THE LIKE
Filed Sept. 5, 1961 4 Sheets-Sheet 4
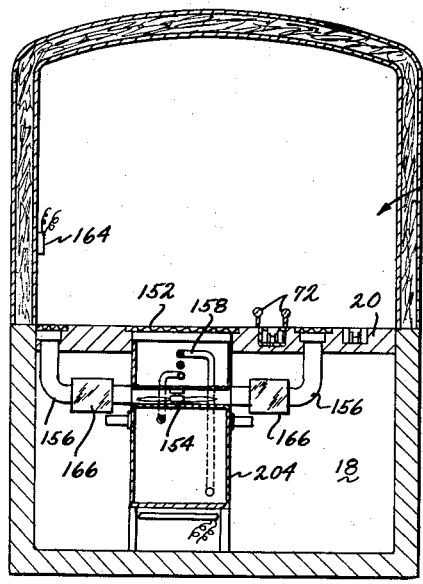
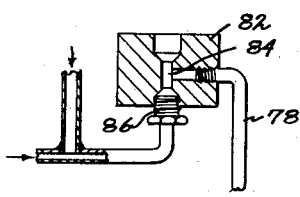
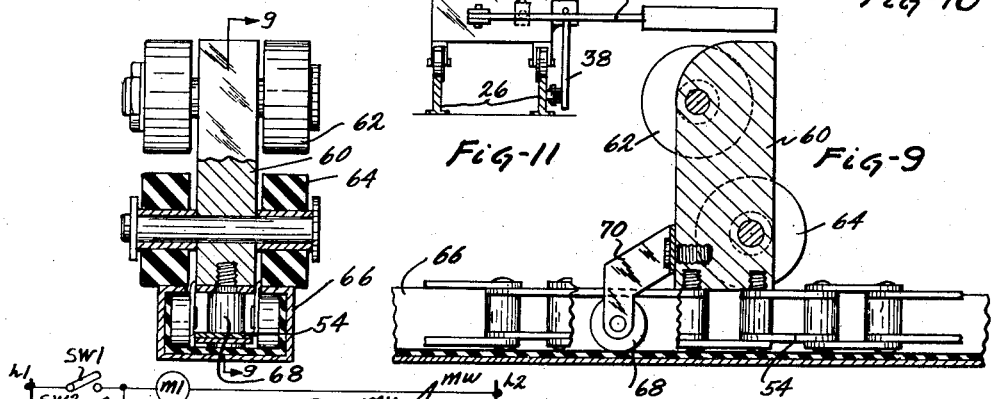
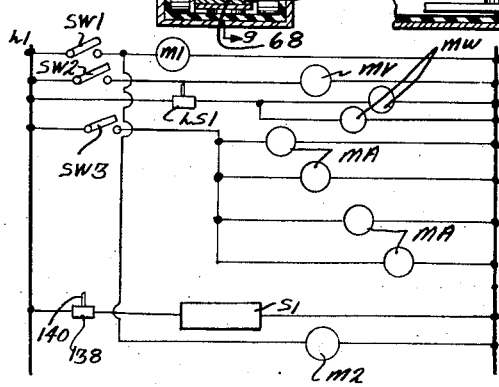
INVENTOR.
WILLIAM P. BROWN
BY
Toulmin & Toulmin
ATTORNEYS

United States Patent Office 3,147,135
Patented Sept. 1, 1964

3,147,135
METHOD AND APPARATUS FOR WASHING AND
WAXING VEHICLES AND THE LIKE
William P. Brown, 421 S. 5th St., Miamisburg, Ohio
Filed Sept. 5, 1961, Ser. No. 136,102
9 Claims. (Cl. 117—49)

This invention relates to a method and apparatus for cleaning vehicles such as automotive vehicles and is particularly concerned with a method and apparatus of this nature which is substantially completely automatic in operation.

Still further, this invention relates to a method and apparatus for cleaning and waxing an automotive vehicle in one continuous over-all cycle.

In the art of washing automotive vehicles, numerous attempts have been made to establish completely automatic washing devices. Such devices have been accompanied with rather indifferent success to date because of the difficulty of setting up an apparatus which will adequately dislodge soil from all parts of the vehicle without using excessive amounts of water and cleaning material and without resorting to large rotating brushes and other mechanical instrumentalities which are objectionable on account of the danger of scratching the finish of the vehicle and on account of the fact that it is extremely difficult to set up any brush arrangement which will automatically adjust itself to the various sizes and contours which might be passed through the washing apparatus.

The net result of the several deficiencies encountered with automatic car washing installations heretofore has been that either a great many expensive attendants are required for carrying out rubbing and washing and drying operations, or else a defective job is done.

The present invention proposes to overcome these drawbacks by providing a new method of cleaning vehicles and a novel apparatus especially designed for carrying out the novel method which not only results in a superior cleaning job but also gives the cleaned vehicle a wax coating which protects the finish of the vehicle.

The protection afforded by the wax finish according to the present invention is superior to the protection provided by wax finishes heretofore because the wax finish is more comprehensively applied and covers all exposed portions of the car and even penetrates into crevices in the body such as are found where body panels are interconnected and between the trim molding and the body and in similar places.

With the foregoing in mind, a primary object of the present invention is the provision of a novel method and apparatus for the superior cleaning of automobiles.

Another object of this invention is the provision of a method and apparatus for cleaning and waxing cars which is fully automatic in operation.

A still further object of this invention is the provision of a method and apparatus for washing and waxing vehicles in which a single multi-compartmented enclosure is employed through which the vehicle being treated moves continuously.

The foregoing objects as well as still other objects and advantages of the present invention will become more apparent upon reference to the following specification taken in connection with the accompanying drawings, in which:

FIGURE 6 is a vertical sectional view indicated by line 6—6 on FIGURE 2 showing the drying compartment between the cleaning and waxing compartments;

FIGURE 7 is a sectional view showing an injector nozzle in section such as is associated with the cleaning and waxing stations;

FIGURE 8 is a vertical sectional view indicated by line 8—8 on FIGURE 1 showing a pusher member by which vehicles are pushed through the apparatus;

FIGURE 9 is a vertical sectional view indicated by line 9—9 on FIGURE 8 showing details of construction of a pusher member;

FIGURE 10 is a more or less diagrammatic view showing the construction and arrangement of one of the automatic wheel scrubbing stations of FIGURE 1;

FIGURE 11 is a sectional view indicated by line 11—11 on FIGURE 10 showing how the wheel scrubbing unit is movably supported so as to follow the wheels as the vehicle moves through the apparatus; and FIGURE 12 is a diagrammatic representation of a portion of the electric control circuit by means of which the apparatus can be controlled.

Figure 1:
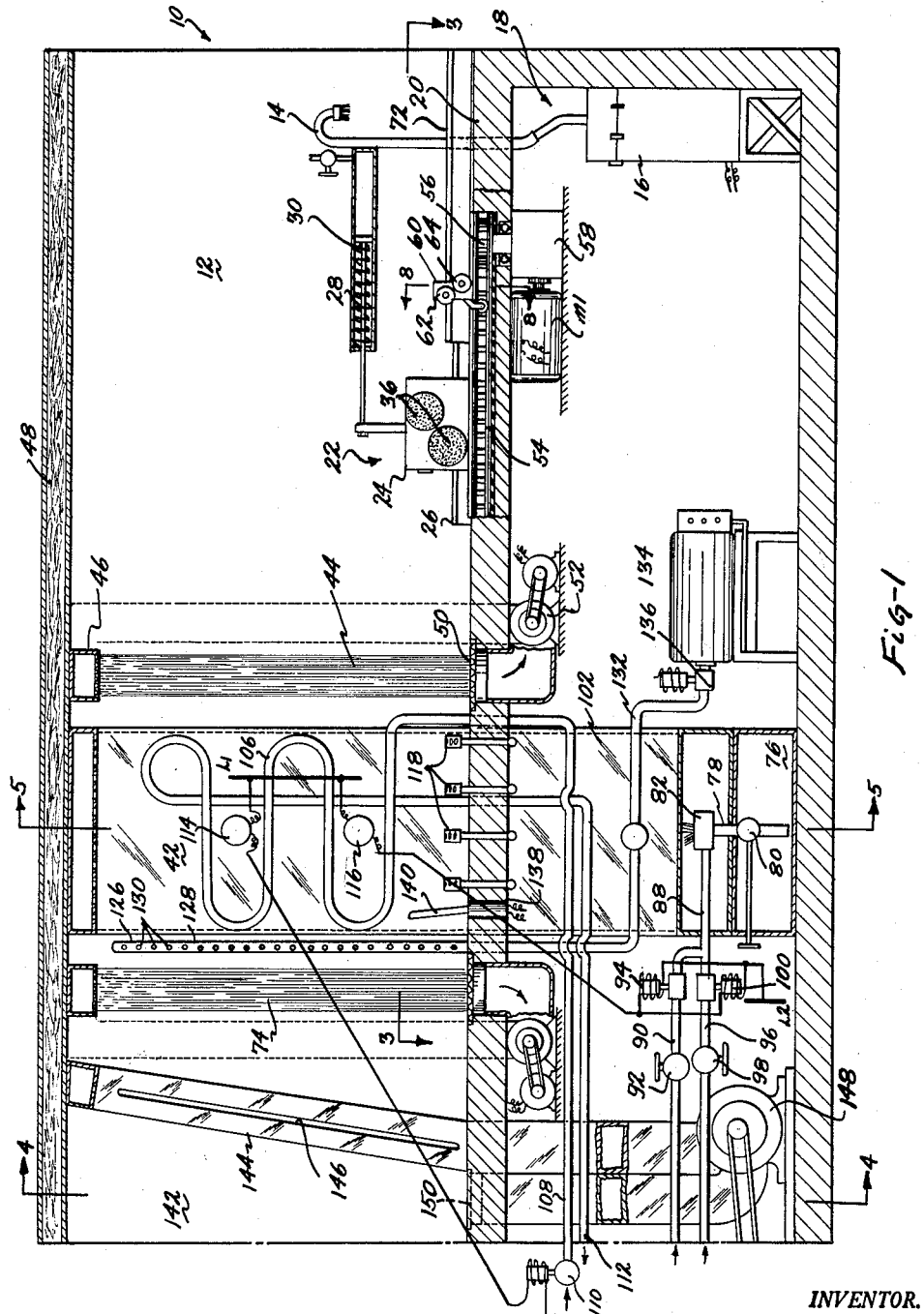
FIGURE 1 is a vertical sectional view through a portion of an apparatus according to this invention showing the end of the apparatus which the car enters and wherein the wheels of the car are scrubbed and the initial cleaning operation and drying operation takes place.
Figure 2:
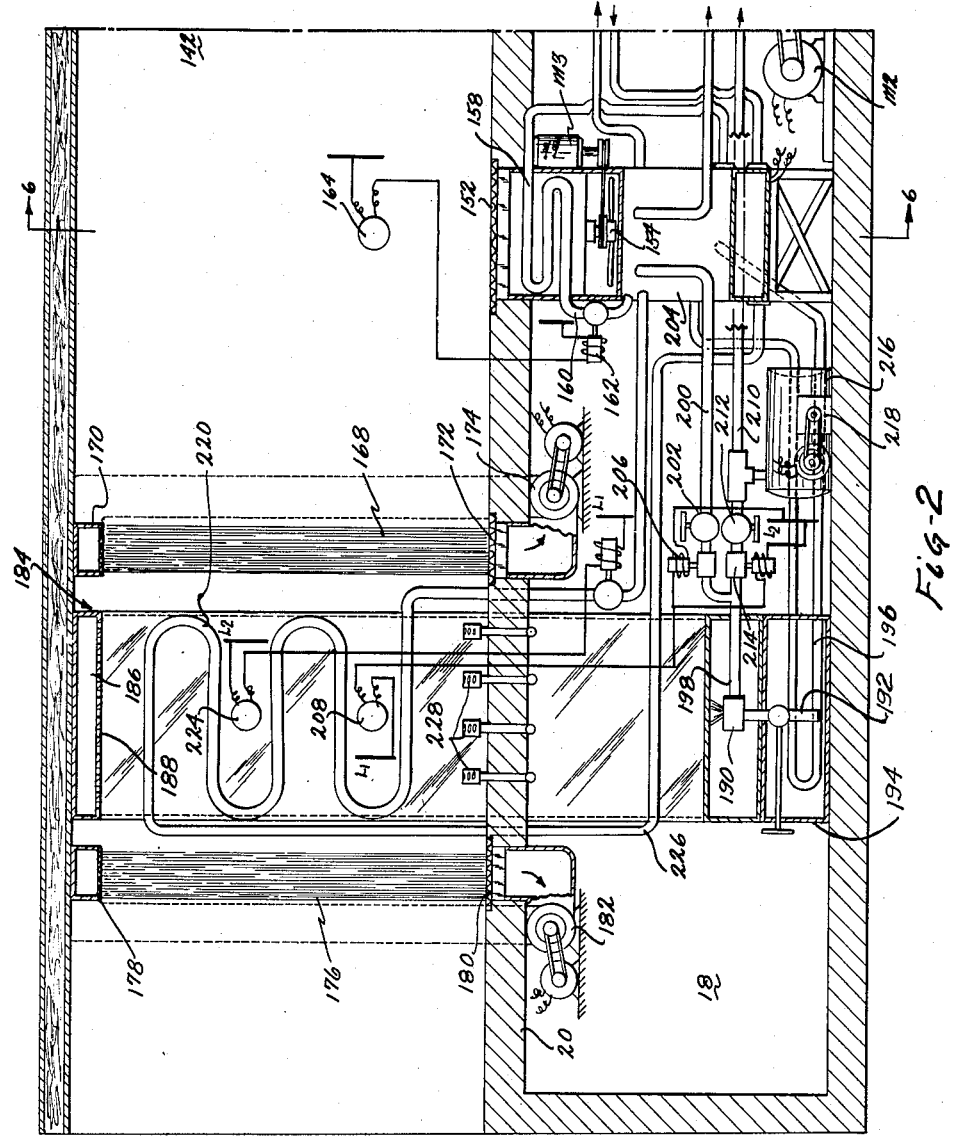
FIGURE 2 is a vertical sectional view which shows the left end of the apparatus through which the car moves after it leaves the portion of the apparatus shown in FIGURE 1 and with the car being completely dried and waxed in the portion of the apparatus shown in FIGURE 2.

Referring to the drawings somewhat more in detail and with particular reference to FIGURES 1 and 2, the apparatus illustrated therein comprises a generally tunnel-like enclosure having an entrance end at 10 for vehicle to be treated. The vehicles enter a first compartment 12 wherein the interiors of the vehicles may be cleaned by the vacuum hoses and brushes at 14 which are connected with a vacuum source 16 and dust collector located in a pit 18 below the level of floor 20 of the apparatus.

Figure 3:
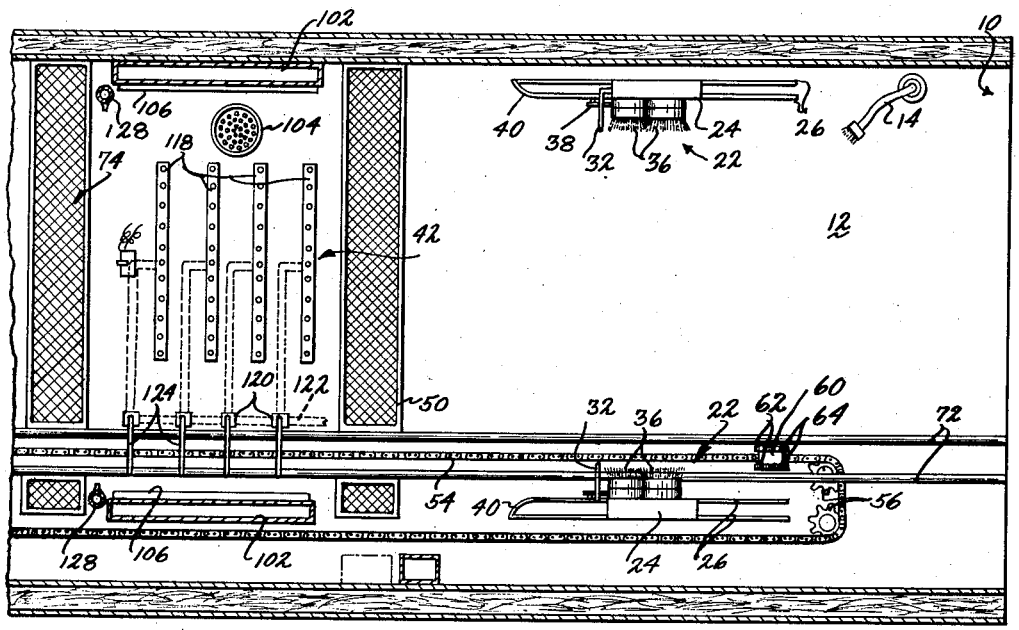
FIGURE 3 is a plan sectional view indicated by line 3—3 on FIGURE 1.
Figure 4:
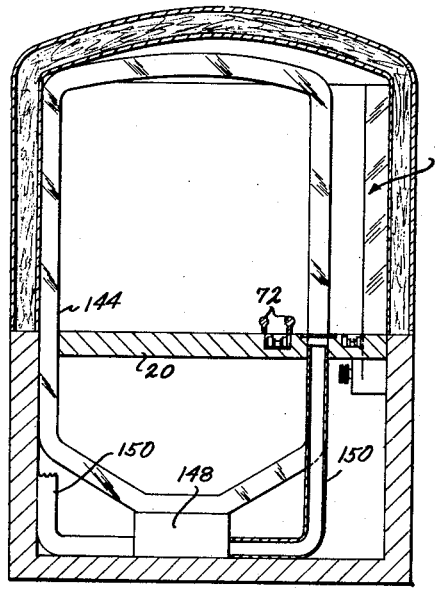
FIGURE 4 is a transverse sectional view indicated by line 4—4 on FIGURE 1 showing the drying compartment.

Immediately beyond the vacuum station in compartment 12 is a wheel washing arrangement consisting of the track mounted wheel washers 22 which, as will be seen in FIGURE 3, include one wheel washing unit at each side of the car. These wheel washing units comprise frames 24 movably mounted on tracks 26 with there being spring means 28 urging the wheel washers to the right. Dash pot means 30 control the speed of movement of the wheel washers rightwardly under the influence of springs 28.

Each wheel washer, as will be seen in FIGURES 10 and 11, has a bar 32 thereon engageable with the adjacent wheel 34 of the vehicle passing through the apparatus so that the wheel washer will be carried along with the vehicle while the brushes 36 of the wheel washer scour the vehicle wheels.

After a predetermined travel of the wheel washer, the support arm 38 thereof runs off the end of a support track 40 and the vehicle wheel 34 can pass on by the wheel washer whereupon the wheel washer retracts and engages the next vehicle wheel. A limit switch LS1 is under the control of arm or bar 32 so that the wheel washers are idle, with respect to the brushes and a supply of washing liquid thereto, until the bar is engaged by a vehicle wheel.

Following the vacuuming and wheel washing compartment 12 there is a cleaning compartment 42. The two compartments are separated by an air curtain 44 established between a duct 46 extending laterally across the top of the enclosure 48 of the device, and a duct 50 extending laterally across the bottom of the enclosure and recessed into the floor. A motor driven blower 52 causes the circulation of air between overhead duct 46 and duct 50 for effectively sealing the two compartments from each other.

Extending substantially the full length of the apparatus and located in a track recessed into the floor 20 is a conveyor chain 54. This conveyor chain is supported on spaced sprockets 56 at opposite ends of the device with one of the sprockets being driven by a motor M1 via a speed reducing angle transmission 58. The chain 54, as will best be seen in FIGURES 8 and 9, has mounted thereon in spaced relation upstanding pusher blocks 60 which are adapted for engaging the back sides of one rear wheel of vehicles passing through the apparatus.

These pusher blocks comprise roller means 62 that directly engage the wheels and have supporting roller means 64 in back at the bottom riding on floor 20 of the apparatus. The track 66 in which chain 54 runs is provided with lateral portions which form track means for receiving rollers 68 carried on brackets 70 attached to pusher blocks 60. This arrangement supports the pusher blocks in a vertical position and carries the thrusts exerted thereon by the vehicle wheels without tending to bend the conveyor chain.

The active reach of the conveyor chain is so positioned that the pusher blocks run between spaced tracks 72 between which the wheels of the vehicle at one side are placed so that the vehicle is guided through the apparatus.

Returning now to compartment 42, it will be observed that it is sealed on the left side, as viewed in FIGURE 1, by a second air curtain 74 which is the same as the previously described air curtain 44 at the right side of compartment 42.

Within compartment 42 a novel treatment of the vehicle takes place which has not heretofore been carried out in any car washing apparatus so far as is known to me. This treatment consists of a vapor cleaning step, somewhat similar in nature to the operation known as vapor degreasing wherein an object is placed in a bath of solvent vapor whereupon the solvent vapor condenses on the article and the solvent runs off carrying with it oils and greases.

According to my invention a solvent vapor is provided in compartment 42 of such a temperature that it will condense on the vehicle body and of such a nature that the solvent will dissolve a wax film that is on the vehicle body whereupon the condensed solvent and the dissolved wax will drain off the vehicle body. In this manner the body of a vehicle which has a wax film thereon, can be completely stripped of the wax while, at the same time, the soil that is on the vehicle body will tend to run off with the solvent and the dissolved wax, or else to become so loosened that it can easily be rinsed from the vehicle body.

While in many cases it will suffice to supply merely solvent vapor to compartment 42, I propose also to supply steam with the solvent vapor so that simultaneously with the condensing of the solvent vapors on the vehicle body, there will also be condensation of the steam so that free water will be present on the vehicle body to provide a washing action in addition to that provided by the solvent bath.

According to my invention, I provide the atmosphere of solvent vapors by providing in pit 18 a tank 76 containing the solvent which is to form the vapors and which tank may or may not be heated. Leading upwardly from the tank is a pipe 78 having a manually adjustable flow control valve 80 therein. At the upper end of conduit 78 is an inductor 82 of the nature shown in section in FIGURE 7. In this inductor, conduit 78 is connected to the throat 84 while a nozzle 86 supplies a high pressure jet to the throat that will draw solvent into the inductor to be admixed with the fluid of the jet and vaporized and passed on to compartment 42.

As will be seen in FIGURE 1, the high pressure jet is supplied by a conduit 88 connected to a steam conduit 90 having a manual valve 92 therein and a normally closed electrically operated valve 94. Conduit 88 is also connected with a compressed air conduit 96 having a manual valve 98 and an electrically controlled valve 100 therein.

The compartment 42 has the vapor supplied thereto by way of a duct arrangement 102 extending up the sides of the compartment and across the top. The top portion of the duct is preferably apertured to admit the vapors which will generally sink downwardly in the compartment and run off when condensed, by way of drain 104 in the floor of the compartment, which drain is seen in FIGURE 3. Air may be supplied to duct 102 if desired to convey the vapors to compartment 42 but, generally, the additional air supply is not necessary.

The temperature within compartment 42 is controlled by a heating arrangement which may take the form of a steam coil or coils 106 supplied by way of conduit 108 having an electrically operated valve 110 therein and drained by way of a conduit 112.

A thermostat 114 in compartment 42 is connected to control valve 110 while a humidistat 116, which may be sensitive to the steam vapors, is connected for controlling one or both of the steam and air valves 94 and 100.

From the foregoing it will be seen that compartment 42 provides a sealed space in which the temperature and vapor concentration is maintained within close limits to provide for the effect desired, namely, copious condensation of solvent vapors or a combination of solvent and water vapors on the body of a vehicle passing therethrough. It will be understood that the normal temperatures of vehicle bodies passing through the compartment will be such as to bring about the condensation referred to.

Inasmuch as the steam vapors referred to will completely envelop the car, they will also tend to dissolve greases and oils from beneath the vehicle and, in order to inhibit this action as much as possible, mounted on the floor of the apparatus in spaced relation in compartment 42, is a plurality of laterally extending spray heads 118 which will supply a spray of cold water to the underside of the vehicle thereby to prevent the undesired dissolving of grease and oil thereon.

Figure 5:
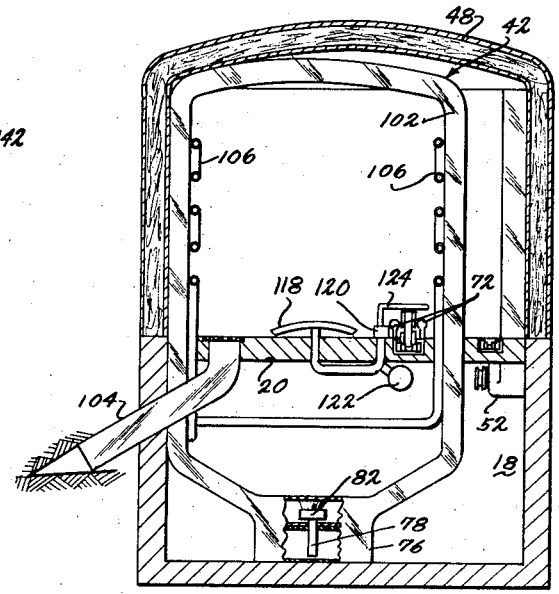
FIGURE 5 is a vertical sectional view indicated by line 5—5 on FIGURE 1 showing the vapor cleaning compartment.

FIGURES 3 and 5 show how the spray heads 118 have connected therewith the normally closed valves 120 that can be opened to admit cold water from a header 122. These valves have operating levers 124 extending into the space between the wheel guiding tracks 72 so as to be tripped by the vehicle wheels as the vehicle passes through the compartment. The valves could be arranged for delayed closing to maintain the spray throughout the time that the vehicle is passing through the compartment if so desired.

It will be noted that the levers 124 are arranged so that the first will actuate the second and so on so that as the vehicle progressively engages the levers 124, the spray heads will be operated so that there will be almost a continuous spray of water to the underside of the vehicle as it passes through the compartment.

Adjacent the exit end of compartment 42, which is the left side as viewed in FIGURE 1, there is a warm water rinse station 126 which consists of a pipe or pipes 128 having a plurality of nozzles 130 distributed therealong and with the pipe being connected by conduit 132 to a supply 134 of water of the proper temperature. An electric valve 136 controls the supply of water from the supply 134 to the pipe or pipes 128 and this valve is connected in circuit with a switch 138 in compartment 42 having an operating lever 140 that is actuated by the vehicle passing through the compartment so that the warm water rinsing of the vehicle body will continue for as long as the vehicle is passing the rinsing station.

As the vehicle emerges from compartment 42 and passes through sealing air curtain 74 it enters a somewhat elongated drying compartment 142 in which the vehicle is thoroughly dried. Immediately after emerging from air curtain 74 the vehicle body is subjected to a high pressure blast of air emerging from duct means 144 which may be provided on opposite sides of the enclosure and across the top and which duct means has a plurality of nozzles or an elongated discharge slit or opening 146.

The air is supplied to the duct 144 from the discharge side of blower 148 driven by motor M2 with the inlet side of the blower being connected to the compartment 142 by way of duct 150.

Intermediate compartment 142, as will be seen in FIGURE 2, is a warm air circulating station wherein there is a floor mounted grille 152 through which the discharge from a blower 154 passes. Blower 154 is driven by a motor M3 and has its suction side connected by ducts 156 with the interior of compartment 142.

A heating coil means 158 is provided in the duct work for heating the air moved by fan 154 and this heating coil means is supplied with steam from a conduit 160 that includes an electrically operated valve 162 under the control of the thermostat 164 in compartment 142. This arrangement provides for the drying of the vehicle body without excessive overheating thereof.

Located in the ducts 156 are dehumidifiers 166 that extract moisture from the air returning from compartment 142 to blower 154. This insures that the air supplied to compartment 142 is dry and this will hasten the drying of the vehicle body.

At the left end of compartment 142 is another air curtain 168 established between an overhead duct 170 and a lower duct 172 between which is connected a blower 174. To the left of air curtain 168 is still another air curtain 176 established between overhead duct 178 and one in the floor of the apparatus at 180 and with there being a blower 182 connected between the ducts. The last mentioned two air curtains define a compartment 184 within which the body of the vehicle, which is now cleaned and dried, has a wax supplied thereto.

This application of the wax film is accomplished by depositing the wax from the vapor phase or while the wax is finely atomized which is an operation similar to what occurs in the previously described washing chamber. The atmosphere of wax vapor or atomized wax is supplied to compartment 184 by means of a duct 186 which extends up at least one side of the compartment and across the top and which is provided with openings 188 from which the atomized or vaporized wax passes into the compartment.

Duct 186 leads downwardly into pit 18 and within the pit has the atomizing or vaporizing head 190 corresponding to the atomizing or vaporizing head illustrated in FIGURE 7.

The suction side of head 190 is connected by conduit 192 with a tank or container 194 containing a supply of wax that is to be delivered to compartment 184. A heating coil 196 in container 194 maintains the wax in a highly fluid and heated condition so that it readily vaporizes or atomizes and so that it will be at such a temperature when it enters compartment 184 that it will readily condense on the body of a vehicle passing through the compartment.

The vaporizing or atomizing head 190 has a supply of steam or air thereto by way of a conduit 198 having a branch 200 with an adjustable valve 202 leading to the steam generator 204. An electrically controlled valve 206 is also provided in this branch which may be under the control of a humidistat 208 located in compartment 184. A second branch conduit leads from conduit 198 to a source of air under pressure. This conduit, indicated at 210, has an adjustable valve 212 therein and an electrically operated valve 214 that is connected in parallel with valve 206 so as to be under the control of the aforementioned humidistat 208.

By the described arrangement, the atomized or vaporized wax can be conveyed to compartment 184 entrained in a steam vehicle, or an air vehicle, or a mixture thereof, depending upon the adjustment of the aforementioned valves.

It will be understood that additional fan means could be provided in association with duct 186, if so desired, to provide for more rapid flow of the wax vapors to compartment 184, if so desired.

The supply of compressed air to conduit 210, as well as the supply of compressed air to conduit 96, was obtained from a compressed air tank 216 in a pit 18 and which has a motor driven compressor 218 associated therewith.

It is desired to control the temperature of the vapor waxing compartment quite closely and, to this end, there is provided in the compartment a heating unit 220 which may be supplied with steam through a valve 222 having an electric operator under the control of thermostat 224 in the compartment. The return line from heater unit 220 is indicated at 226. It is preferable for the vapor wax compartment to include cold water spray heads 228 which correspond in structure to the spray heads 118 already described in connection with the vapor washing compartment.

The spray heads 228 are arranged in association with valves operated by a wheel of the vehicle in the same manner as the valves for the spray heads in the vapor washing compartment.

FIGURE 12 shows, more or less diagrammatically, one control circuit which may be employed for controlling the operation of the vapor washing and waxing apparatus of the present invention.

In this figure, power lines are indicated at L1 and L2 and therebetween is the conveyor chain drive motor M1 in series with which is a normally open switch SW1 which can be closed to energize the motor and set the conveyor chain into operation.

The motors for the vacuuming units are indicated at MV and are also connected between power lines L1 and L2 in circuit with a second switch SW2 which can be closed to activate the vacuum units for the manual vacuuming of the vehicle interiors as they enter the washing apparatus.

The wheel washers, previously described, embody the motors MW and these are in circuit between power lines L1 and L2 and in series with normally open limit switch SW1 which is closed when the pertaining wheel washer is engaged by a vehicle wheel.

The motors for the several air curtains are indicated at MA and are connected in circuit between power lines L1 and L2 with still another switch SW3 so that closing of switch SW3 will bring about operation of all of the air curtains of the apparatus.

The warm water sprays 128 are under the control of valve 136 which has an electric operator S1 which, as will be seen in FIGURE 12, is in circuit between power lines L1 and L2 with limit switch 138 having the car operated lever 140.

The blower 148 has its motor M2 connected between power line L1 and the side of switch SW1 opposite power line L1 so that as soon as switch SW1 is closed, the blower 148 will be activated and air under pressure will be blown from the slit or nozzles in conduit 144.

With reference to the present invention, it will be understood that while I prefer to have the solvent and wax condense on the vehicle body from the vapor phase, and which vapor may be entrained in a carrier gas, it will further be understood that the present invention also contemplates atomizing the wax and solvent so that it is actually suspended in the form of droplets so that the vehicle body will be completely wet thereby passing through the pertaining station of the machine.

Suitable masking may be applied to the vehicle windows and windshield, if so desired, so that the wax does not have to be removed therefrom when the car leaves the washer, but since the wax film will be quite thin, it would be an easy matter in any case to remove the wax from the glass areas of the vehicle, and which would at the same time have a cleaning effect on these parts of the car.

As to particular solvents to be employed, a wide range of solvent materials is available, and it will be understood that where the solvent is to condense on the vehicle body it should have a dew point such that condensation would occur on the vehicle body at the temperature at which the body is introduced into the vapor washing compartment. The solvent vapors can be heated so that the dew point could be directed high enough so that this condensation will be extremely rapid. The solvent should, of course, be one which would not damage the vehicle finish, as preferably one which would have no effect on the rubber portions of the vehicle, such as the tires and the sealing strips about the windows and the like.

I do not wish to exclude detergents and soaps from the vapor washing step, because these can sometimes be employed by themselves, or in combination with solvents for the emulsifying and loosening of wax and grease film. Inasmuch, as the washing step is followed by a high pressure rinsing operation, it will be evident that the emulsifying and loosening of the wax and grease and oil from the car body will be sufficient to cause complete removal thereof during the rinsing operation.

It will, therefore, be evident that there are a number of commercial preparations already on the market that could be utilized for creating an atmosphere in the vapor washing compartment that would have the effect of acting on the wax and grease on the car body so that it will readily rinse off in the high pressure rinse station.

The foregoing comments apply also to the waxing compartment where the atmosphere can either be a vapor of the wax to be applied or a wax mixed with a solvent, or may consist of an atmosphere of fine droplets of the wax and solvent, such as would be obtained if this material were atomized and carried into the waxing compartment.

Commercial waxes are available which are in the form of a thin liquid which is a wax, such as Pernambuco base wax, with sufficient solvent to make it thin and flowable, so that it can be readily applied on a car body or sprayed thereon with a spraying apparatus. Such waxing compositions or the like would be suitable for any purpose that could be vaporized or atomized and delivered to the waxing department for condensation or precipitation, or a combination of both, on the body of a vehicle.

While the selection of the particular waxes and solvents to be employed will largely be a matter of individual preference, I have considered the use of microcrystalline waxes which are solid hydrocarbons of higher molecular weight than paraffin waxes. These waxes are complex mixtures of paraffine, isoparaffine, and napthenic solid hydrocarbons averaging around 580 to 700 in molecular weight.

Oxidation of these waxes yields an emulsifiable wax which can be put into stable dispersion by forming soaps of organic amines or other saponifying agents during emulsification.

Such dispersions can be used to create a fog or atmosphere or droplets which will deposit on the car body and give a rubless polish film which will require only a wiping off of free water to yield a finished end result.

Inasmuch as I contemplate the use of my invention during all types of weather, I wish to include in this disclosure the idea of providing a pre-rinse station ahead of the wash compartment which will employ water at from 85°–95° F. and which will serve to warm the glass areas to such an extent as to prevent breakage thereof due to thermal shock in the wash compartment. The construction of the pre-rinse station could be like the rinse station shown with a provision made to hold the water temperature at the proper level.

It will be understood that this invention is susceptible to modification in order to adapt it to different usages and conditions and accordingly, it is desired to comprehend such modifications within this inventon as may fall within the scope of the appended claims.

I claim:

1. A method of cleaning and waxing car bodies which includes; establishing an atmosphere of solvent vapor and a carrier gas at a temperature above the condensation temperature of the solvent, moving a car into the said atmosphere with the car at a temperature not exceeding the said condensation temperature whereby the solvent will condense on the body of the car and dissolve the wax thereon and loosen soil therefrom, directing a cold water spray against the underside of the car body while it is in said atmosphere, rinsing the car with warm water, blowing loose moisture from the car body, drying the car body, establishing an atmosphere of wax vapors at a temperature above that of the body of the car, and moving the clean dry car body into the atmosphere of wax vapors whereby the wax will condense on the car body and form a wax film thereon.

2. A method of cleaning car bodies which includes; establishing an atmosphere of solvent vapor and a carrier gas at a temperature above the condensation temperature of the solvent, moving a car into the said atmosphere with the car at a temperature not exceeding the said condensation temperature whereby the solvent will condense on the body of the car and dissolve the wax thereon and loosen soil therefrom, directing a cold water spray against the underneath side of the car body while it is in said atmosphere, and moving the car out of the said atmosphere and rinsing and drying the car body.

3. The method of cleaning and waxing a car body which comprises; moving the car through an enclosure, dividing the enclosure into a plurality of serially arranged compartments by air curtains, establishing an atmosphere of solvent vapor in a first of said compartments which will condense on the car body and loosen dirt and wax therefrom as it passes therethrough, directing a cold water spray against the underside of the car body while it is in said atmosphere, driving the car body in a second of said compartments, and establishing a wax vapor in a third of said compartments which will condense on the car body as it passes therethrough.

4. An apparatus for cleaning car bodies comprising; a tunnel-like enclosure, air curtains within the enclosure dividing it into compartments, a body of normally liquid car wax solvent, means for vaporizing said solvent and for delivering it in the vaporized state to one of said compartments, means for maintaining the temperature and concentration of the solvent vapor in said compartment between predetermined limits, and means for moving cars through said compartment whereby the solvent condenses on the bodies thereof and dissolves wax and loosens soil, there being cold water spray heads in the compartment beneath the car passing therethrough, and means operated by the car for supplying water to the spray heads to spray the underneath side of the car as it passes through the compartment, thereby preventing the underside of the car from being degreased.

5. An apparatus for cleaning car bodies comprising; a tunnel-like enclosure, air curtains within the enclosure drividing it into compartments, a body of normally liquid car wax solvent, means for vaporizing said solvent and for delivering it in the vaporized state to one of said compartments, means for maintaining the temperature and concentration of the solvent vapor in said compartment between predetermined limits, and means for moving cars through said compartment whereby the solvent condenses on the bodies thereof and dissolves wax and loosens soil, there being cold water spray heads in the compartment beneath the car passing therethrough, valves connected to said spray heads, operating levers on the valves actuated by a car passing through the compartment, said spray heads being spaced in the direction of movement of the car, said levers being arranged for sequential engagement by the car, and at least the final opening movement of each lever initiating the opening movement of the next succeeding said lever.

6. In a car cleaning apparatus; a tunnel-like enclosure, car body treating compartments serially arranged in said enclosure, air curtains separating said compartments, a body of liquid car wax solvent, means for vaporizing said solvent and for delivering it in the vaporized state to one of said compartments, means for maintaining the temperature and concentration of the solvent in said compartment between predetermined limits, and means for moving cars through said compartment whereby the solvent condenses on the bodies thereof and dissolves wax and loosens soil, there being cold water spray heads in the compartment beneath the car passing therethrough and means operated by the car for supplying water to the spray heads to spray the underside of the car as it passes through the compartment, said means for moving cars through the enclosure comprising a chain loop having a reach extending along the floor of the compartment from end to end, a track in the enclosure floor receiving the said reach of the chain loop, car wheel engaging guide rail members upstanding from the enclosure floor on each side of the track, and pusher members attached to the chain in spaced relation therealong for engagement with the back of a wheel of a car between said guide rail members to push the car through the enclosure, each pusher member having roller means in the front engaging the car wheel and other roller means in the back engaging the floor of the enclosure, said pusher members also including roller means engaging lateral recesses in the said track, said roller means providing for support of said pusher member so the chain is free of bending stresses.

7. In a car cleaning apparatus; a tunnel-like enclosure, spaced air curtains in the enclosure defining a compartment, a body of car wax, wax vaporizing means, means for conveying the vaporized wax to the enclosure to establish an atmosphere of the said wax, means for maintaining the concentration of wax and the temperature thereof within close limits in said compartment, and means for moving cars through said compartment with the bodies of the cars at a temperature which is below the condensation temperature of the wax, there being spray heads in the bottom of the compartment operable during movement of a car through the compartment to supply a spray of cold water to the underneath side of the car.

8. In a car cleaning apparatus; an elongated tunnel-like enclosure open at both ends, spaced air curtains in the enclosure dividing it into a plurality of serially arranged compartments, means for moving cars to be cleaned through said enclosure from one end thereof to the other, means in the enclosure preceding the first air curtain encountered by a car for cleaning the wheels of the car, means located between the first two air curtains in the enclosure for maintaining an atmosphere of car wax solvent vapors which condense on the body of a car passing therethrough, warm water spray means adjacent the exit end of the compartment defined by the first two air curtains for rinsing the body of the car as it approaches the exit end of the compartment, a high pressure air blast means in the enclosure following the second of said air curtains for blowing loose moisture from the body of the vehicle, means for supplying warm dry air to the compartment defined by the second and third air curtains for drying the vehicle body, and means in the compartment defined by the third and fourth air curtains in the air enclosure for establishing an atmosphere of condensable wax vapors therein which will condense on the body of a vehicle passing therethrough whereby in one pass through the enclosure the body of a vehicle is cleaned and dried and has a wax film applied thereto, each of the said vapor compartments comprising spray means directed upwardly from the floor for spraying the underneath sides of the cars as they pass through the said vapor compartments.

9. In a car cleaning apparatus; an elongated tunnel-like enclosure open at both ends, spaced air curtains in the enclosure dividing it into a plurality of serially arranged compartments, means for moving cars to be cleaned through said enclosure from one end thereof to the other, means in the enclosure preceding the first air curtain encountered by a car for cleaning the wheels of the car, means located between the first two air curtains in the enclosure for maintaining an atmosphere of car wax solvent vapors which condense on the body of a car passing therethrough, warm water spray means adjacent the exit end of the compartment defined by the first two air curtains for rinsing the body of the car as it approaches the exit end of the compartment, a high pressure air blast means in the enclosure following the second of said air curtains for blowing loose moisture from the body of the vehicle, means for supplying warm dry air to the compartment defined by the second and third air curtains for drying the vehicle body, and means in the compartment defined by the third and fourth air curtains in the air enclosure for establishing an atmosphere of condensable wax vapors therein which will condense on the body of a vehicle passing therethrough whereby in one pass through the enclosure the body of a vehicle is cleaned and dried and has a wax film applied thereto, each of the said vapor compartments comprising spray means directed upwardly from the floor for spraying the underneath sides of the cars as they pass through the said vapor compartments, the said means for supplying warm dry air to the compartment between the second and third air curtains comprising a blower for blowing air into the compartment, a heater over which the blown air passes, return conduits leading from the compartment to the blower, and dehumidifying means for drying the air returning from said compartment to the blower.

References Cited in the file of this patent
UNITED STATES PATENTS

| | | |
|---|---|---|
| 1,399,415 | Taliaferro | Dec. 6, 1921 |
| 1,905,968 | Robertson | Apr. 25, 1933 |
| 1,934,494 | Gillespie | Nov. 7, 1933 |
| 2,107,465 | Borggaard | Feb. 8, 1938 |
| 2,159,351 | Burns | May 23, 1939 |
| 2,728,686 | Borushko | Dec. 27, 1955 |
| 2,761,170 | Bonneau | Sept. 4, 1956 |
| 2,822,564 | Crivelli | Feb. 11, 1958 |
| 2,862,222 | Cockrell | Dec 2, 1958 |
| 2,981,266 | Tamburri | Apr. 25, 1961 |
| 3,015,576 | Hendrixson et al. | Jan. 2, 1962 |
| 3,037,223 | Lovsey | June 5, 1962 |
| 3,045,358 | Breakell et al. | July 24, 1962 |
| 3,058,433 | Hurst | Oct. 16, 1962 |

FOREIGN PATENTS

| | | |
|---|---|---|
| 517,234 | Canada | Oct. 4, 1955 |
| 350,263 | Great Britain | June 11, 1931 |